(12) United States Patent
Ebigt et al.

(10) Patent No.: US 8,584,485 B2
(45) Date of Patent: Nov. 19, 2013

(54) AIRCRAFT COOLING SYSTEM EVAPORATOR ARRANGEMENT FOR TWO INDEPENDENT COOLANT CIRCUITS

(75) Inventors: Wolfgang Ebigt, Hamburg (DE); Wilson Willy Casas Noriega, Hamburg (DE)

(73) Assignee: Airbus Operations GmbH (DE)

( * ) Notice: Subject to any disclaimer, the term of this patent is extended or adjusted under 35 U.S.C. 154(b) by 708 days.

(21) Appl. No.: 12/675,496

(22) PCT Filed: Sep. 1, 2008

(86) PCT No.: PCT/EP2008/007129
§ 371 (c)(1),
(2), (4) Date: Sep. 15, 2010

(87) PCT Pub. No.: WO2009/030449
PCT Pub. Date: Mar. 12, 2009

(65) Prior Publication Data
US 2010/0326104 A1     Dec. 30, 2010

Related U.S. Application Data

(60) Provisional application No. 60/969,193, filed on Aug. 31, 2007.

(30) Foreign Application Priority Data

Aug. 31, 2007 (DE) .......................... 10 2007 041 275

(51) Int. Cl.
*F25B 7/00* (2006.01)

(52) U.S. Cl.
USPC .... 62/335; 62/79; 62/113; 62/175; 62/DIG. 5

(58) Field of Classification Search
USPC .......................... 62/79, 113, 175, 335, DIG. 5
See application file for complete search history.

(56) References Cited

U.S. PATENT DOCUMENTS

| 6,381,974 B1 | 5/2002 | Hwang et al. |
| 6,880,353 B1 | 4/2005 | Yap et al. |
| 2005/0061012 A1 | 3/2005 | Zywiak et al. |

FOREIGN PATENT DOCUMENTS

| DE | 1601023 | 7/1970 |
| DE | 102006022557 A1 | 11/2006 |
| EP | 1878660 A2 | 1/2008 |
| WO | WO 2005/030579 A1 | 4/2005 |

OTHER PUBLICATIONS

PCT International Search Report for PCT/EP2008/007129 completed by the EP Searching Authority on Nov. 19, 2008.

*Primary Examiner* — Cheryl J Tyler
*Assistant Examiner* — Jonathan Bradford
(74) *Attorney, Agent, or Firm* — Barnes & Thornburg, LLP

(57) ABSTRACT

An aircraft cooling system evaporator arrangement has an evaporation device including four evaporators that are hydraulically separate from each other with respect to coolant flow. Refrigerant flows from a feed line into first and second evaporators, from the first evaporator into and through a third evaporator, and from the second evaporator into and through a fourth evaporator. The first and third evaporators define a first pair of evaporators arranged parallel to a second pair of evaporators defined by the second and fourth evaporators. First and second coolant supply lines of a first coolant circuit supply coolant to one of the evaporators in each of the first and second pair of evaporators respectively, and first and second coolant supply lines of a second, independent coolant circuit supply coolant to the other of the evaporators in each of the first and second pair of evaporators respectively.

15 Claims, 2 Drawing Sheets

8,584,485 B2

AIRCRAFT COOLING SYSTEM EVAPORATOR ARRANGEMENT FOR TWO INDEPENDENT COOLANT CIRCUITS

CROSS-REFERENCE TO RELATED APPLICATIONS

This application is a U.S. national counterpart application of International application Ser. No. PCT/EP2008/007129 filed Sep. 1, 2008, which claims priority to U.S. Provisional Patent Application No. 60/969,193 filed Aug. 31, 2007 and to German Patent Application No. 102007041275.6 filed Aug. 31, 2007.

FIELD OF THE INVENTION

The present invention relates to an aircraft cooling system evaporator arrangement with at least two mutually independent coolant circuits.

BACKGROUND

In the following description and in the appended claims, by the term 'coolant' a medium is designated that, when used in a cooling system, transports cold or heat substantially without change of phase between sites of differing temperature (though short-term local changes of phase in the coolant medium may occur). This holds, of course, for the operating conditions for which the system in question is designed, since a change of phase can always be brought about under sufficiently extreme conditions. Coolants are generally present in the liquid state. Water mixed with alcohol or with another antifreeze agent may, for example, be employed as coolant.

The term 'refrigerant', on the other hand, designates in the present case a medium that changes its state of aggregation in the course of the transport of cold or the transport of heat. As a rule, gaseous refrigerant is cooled down in a condenser and, in the process, passes over into the liquid state. By exchange of heat with a medium to be cooled, for example the coolant, the liquid refrigerant can evaporate and cool down the medium to be cooled by extracting therefrom the energy (enthalpy of evaporation) necessary for evaporating the refrigerant. This definition too relates to the conditions for which the system in which the refrigerant is being used is designed. Frequently $CO_2$ or hydrocarbon compounds find application as a refrigerant.

Modern commercial aircraft are, for the most part, equipped with cooling systems, in order, for example, to make cooling functions available for galleys. The cooling systems should not be confused with the air-conditioning systems which are likewise present for regulating the air temperature and the atmospheric condition in the cabin and are, as a general rule, independent of these systems. In particular, larger aircraft frequently have more than one load with a cooling requirement; for example, several galleys may be present.

Hitherto this plurality of loads has frequently been supplied in decentralised manner. Each load was provided with a separate cooling unit or refrigerating machine assigned to it. Such a cooling unit is, as a rule, supplied in flight with cool ram air from a ram-air inlet. The ram air flows through a condenser and thereby cools a refrigerant. Via a customary refrigerant circuit the refrigerant is supplied to an evaporation device or evaporator in which a coolant is cooled by exchange of heat with the refrigerant. Therefore in conventional systems a plurality of different refrigerating machines or evaporation devices are necessary, which are matched to the relatively low cooling requirement of the individual loads. In conventional systems of such a type, waste heat is released into the fuselage of the aircraft, placing an additional burden on the air-conditioning system.

In modern commercial aircraft, however, use is increasingly being made of centralised aircraft cooling units. The various loads are supplied with cooled coolant, whereby in each instance one or more centralised evaporation devices are provided for cooling the coolant for several loads. In systems of such a type, the refrigerant with which the coolant is cooled is cooled by ram air, just as described above. However, in centralised systems fewer but larger ram-air inlets are provided, in order to ensure sufficient cooling.

As a rule, in centralised cooling systems of such a type two independent circuits for coolants of two refrigerating machines are cooled with refrigerant circuits, in order to ensure redundancy. Frequently in this case the evaporation devices are arranged one after the other in series in a refrigerant circuit.

WO 2005/030579 A1 describes an evaporator arrangement for an aircraft-galley cooling unit, in which four evaporators are employed. In each instance a pair of evaporators is flowed through by a stream of refrigerant. The two parallel arrangements are separate from one another, and each evaporator cools a separate stream of coolant.

DE 10 2006 022 557 A1 describes an ejector-pump circuit apparatus. According to this document, a stream of refrigerant is fed into different evaporators by passing through various throttle devices and an injection pump in various pressure states.

Given intense (cooling) loading of the coolant circuits, in particular given variably intense loading of the coolant circuits, the problem may arise that one of the coolant circuits requires so much cooling that the refrigerant has already passed over into the gas phase in such large proportions that a sufficient cooling of the following coolant circuit is no longer possible. It may even happen that an intensely loaded first coolant circuit completely evaporates the refrigerant in a first evaporator, so that virtually no cooling of the second circuit is possible any longer. A measurement and control of the stream of refrigerant at various places with several sensors and valves, intended to help prevent such states, is elaborate, costly and complex.

There is therefore a requirement for an aircraft cooling system evaporator arrangement that circumvents these problems and at the same time is simple and inexpensive in its manufacture.

SUMMARY

With a view to solving the aforementioned problem, the present invention provides an aircraft cooling system evaporator arrangement with an evaporation device for exchanging heat between a refrigerant and a coolant, the evaporation device including at least four evaporators which are hydraulically separate from one another with respect to flow of coolant. The arrangement further includes at least one feed line for supplying refrigerant to the evaporation device, the evaporators being arranged in such a way that they are flowed through pairwise in parallel by refrigerant supplied through the feed line of the evaporation device. Moreover, two mutually independent coolant circuits are provided, each coolant circuit including at least two supply lines arranged to be hydraulically separate from one another for supplying coolant to, in each instance, one of the evaporators, and each of at least two evaporators flowed through pairwise in parallel by refrigerant being connected to a coolant supply line of another coolant circuit. As a result, it can be ensured that in the case of an enormous cooling load of a coolant circuit the latter does not allow a large fraction or even all of the refrigerant to pass over into the gas phase in the evaporation device without another coolant circuit being able to be at least partially cooled. By virtue of the arrangement according to the invention, at any rate two branches of various coolant circuits assigned to evaporators flowed through in parallel by refrigerant are equally supplied with refrigerant.

Therefore for at least the fraction of the coolant of a coolant circuit that is flowing in these branches a cooling by refrigerant with sufficiently high degree of saturation of liquid refrigerant is available. The evaporation device is preferentially integrally formed. It may exhibit precisely four evaporators, by virtue of which an efficient distribution of cooling surface to the coolant circuits within the evaporation device can be established without having to construct the evaporation device to be unnecessarily complex and heavy. Moreover, the at least two supply lines of a coolant circuit which are arranged to be hydraulically separate may have been arranged to be hydraulically parallel with respect to flow of coolant.

In this case, at least two groups of evaporators flowed through in each instance pairwise in parallel by refrigerant are arranged hydraulically in series with respect to flow of refrigerant, and evaporators provided for consecutive perfusion by refrigerant are assigned to differing coolant circuits. Accordingly, a series connection arises of evaporators flowed through pairwise in parallel by refrigerant. Consequently, by virtue of a simple structural measure a favourable distribution of cooling surface within the evaporation device can be established which contributes towards the simple supplying of several independent coolant circuits with refrigeration. Accordingly, exchange of heat with various coolant circuits takes place with respect to a stream of refrigerant through several evaporators flowed through in succession, as a result of which a distribution of the cooling capacity of a stream of refrigerant to various coolant circuits is made possible.

Furthermore, there may be provision that the aircraft cooling system evaporator arrangement includes for each coolant circuit at least two discharge lines arranged to be hydraulically separate from one another for discharging coolant from, in each instance, at least one of the evaporators, each of at least two evaporators flowed through pairwise in parallel by refrigerant being connected to a coolant discharge line of another coolant circuit. By virtue of the discharge lines, the coolant circuits can be extended and finally merged to form closed circuits. In this case the at least two discharge lines of a coolant circuit arranged to be hydraulically separate with respect to flow of coolant may have been arranged to be hydraulically parallel.

In a further development of the invention at least two evaporators flowed through in parallel by refrigerant are designed for through flow of refrigerant taking place in opposite directions relative to one another. As a result, a counterflow of coolant in evaporators flowed through in parallel by refrigerant can be obtained. This results in a balance of forces exerted on the evaporation device by the streams of coolant, and improves the exchange of heat. In this case there may be provision, in particular, that in each instance two evaporators flowed through in parallel by refrigerant are designed for perfusion by coolant in opposite directions. In this way, the flow conditions and heat-exchange conditions for the entire evaporation device can be improved.

Furthermore, there may be provision that the evaporator arrangement includes at least one drain line for discharging refrigerant from the evaporation device. In this case it is a particular advantage if a refrigerant sensor is arranged in the drain line. Such an arrangement makes it possible to monitor and, for example, to regulate the state of the refrigerant downstream of the evaporation device. In particular, such a sensor is an advantage in order to establish whether sufficient refrigerant is being conducted through the evaporation device in order to satisfy the cooling requirements, or whether the cooling load is so high that the refrigerant is evaporating completely. Such a complete evaporation permits the conclusion that insufficient refrigerant is flowing through the evaporation device.

The refrigerant sensor preferably takes the form of a temperature sensor. By the temperature of the refrigerant downstream of the evaporation device being determined, inferences as to the state of the refrigerant can be made reliably; in particular, it is possible to establish whether the refrigerant has evaporated completely. In alternative embodiments the refrigerant sensor may also have been designed as a pressure sensor or density sensor. Other types of sensors are also possible, so long as they permit an excessive vapour content or gas content in the refrigerant downstream of the evaporation device to be established reliably. It is to be pointed out that the arrangement according to the invention requires only one sensor in order to monitor the refrigerant for the cooling of several mutually independent coolant circuits.

In advantageous manner the sensor is capable of generating electrical sensor signals. Signals of such a type can be passed on and subjected to further processing particularly easily.

In a further development of the invention an expansion valve is provided for controlling a supply of refrigerant to the evaporation device. In this case the expansion valve is preferably arranged in the feed line. In this way the stream of refrigerant through the evaporation device for cooling the coolant circuits can be controlled in simple manner by a single expansion valve.

The expansion valve may be a valve that is capable of being driven electrically, in order to enable a reliable control of the refrigerant flowing through the valve also by spatially remote control units.

The present invention also relates to a cooling unit of an aircraft that includes an evaporator arrangement described above.

The invention further relates to an aircraft that includes such a cooling unit or an evaporator arrangement described above.

DETAILED DESCRIPTION OF THE FIGURES

Figure 1:
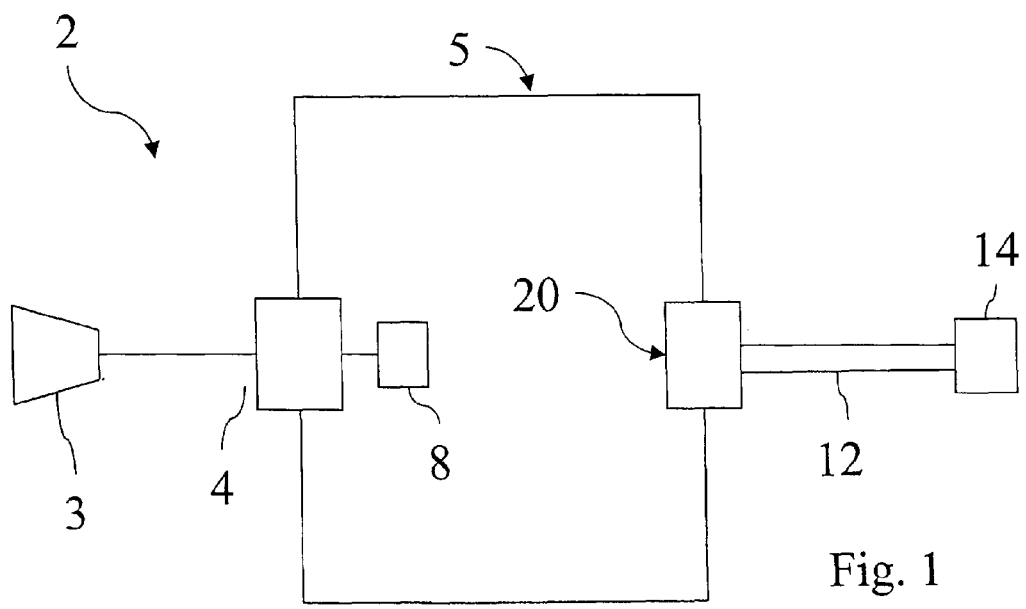
FIG. 1 shows an aircraft cooling system schematically.

In FIG. 1 an aircraft cooling system 2 is represented schematically. The aircraft cooling system 2 has a ram-air inlet 3, through which cold air from the external environment of the aircraft is supplied. This cold air is conducted to a condenser 4 which is part of a refrigerant circuit 5. Via an air outlet 8 the ram air can be discharged into the external environment of the aircraft after it has performed its cooling function.

The refrigerant circuit 5 further includes an evaporation device 20. In the refrigerant circuit 5 a refrigerant is conducted which in operation can assume two phases, ordinarily liquid and gaseous. Further customary components of the refrigerant circuit—such as compressor, filter, etc.—are not shown in this simplified representation, in order to obtain clarity of the Figure; a person skilled in the art will add components of such a type as needed.

The evaporation device 20 is, in addition, part of a circuit 12 for a coolant and serves for exchange of heat between refrigerant and coolant. The coolant circuit 12 brings a coolant to, for example, several loads denoted overall by 14, for example refrigerators of galleys. The precise dimensioning and the course of the coolant circuit 12 are given by the requirements and arrangement of the loads of a particular aircraft.

For the sake of simplicity, only one coolant circuit 12 is represented here; as a rule, however, two or more coolant circuits are present which are linked to the evaporation device 20. These several coolant circuits then supply various groups of loads. As a result, a redundancy arises, so that a cooling capacity is still present in the event of failure of a coolant circuit.

In operation, incoming cold ram air (which at customary altitudes has a temperature of approximately −55° C.) cools down gaseous refrigerant in the condenser 4, so that the refrigerant condenses. On the other side of the refrigerant circuit 5 the refrigerant in the evaporation device 20 is caused to exchange heat with the coolant in the coolant circuit 12. The refrigerant evaporates and draws the energy of evaporation needed for this from the coolant, which is cooled down as a result. The coolant is then supplied to the loads 14 via the coolant circuit 12.

Figure 2:
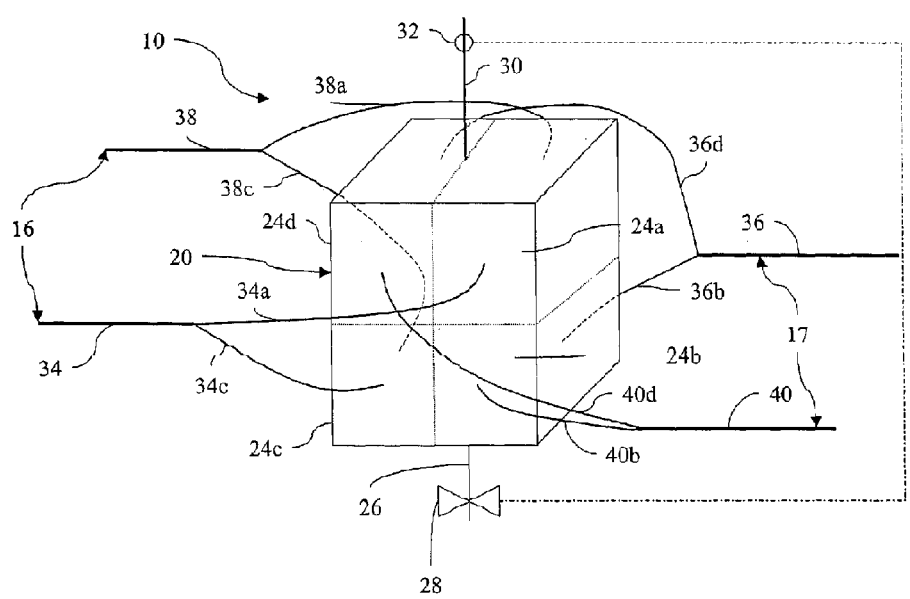
FIG. 2 shows an evaporator arrangement according to the invention.

In FIG. 2 an evaporator arrangement 10 according to the invention is represented schematically. In this embodiment the evaporator arrangement 10 includes an evaporation device 20 which is subdivided into four evaporators 24a, 24b, 24c and 24d and integrally formed. The subdivisions of the evaporation device 20 are indicated by dotted lines which are not designated. By way of evaporation device 20, use may be made of any suitable conventional evaporation device, for example a plate-type evaporation device. In the evaporators 24a-d, refrigerant and coolant are caused to exchange heat. In the process, a more or less large fraction of the refrigerant evaporates.

The four evaporators 24a, 24b, 24c, 24d are hydraulically separate from one another with respect to a flow of coolant. This means that a separate stream of coolant can form in each evaporator 24a-d. This hydraulic separation with respect to the coolant can be obtained, for example, by suitable incorporation of separating plates into the evaporation device 20. With respect to a stream of refrigerant, on the other hand, there is provision that the evaporators 24b, 24c and 24a, 24d are in each instance flowed through pairwise in parallel by refrigerant. Furthermore, refrigerant can flow in each instance from evaporator 24c to evaporator 24d and from evaporator 24b to evaporator 24a. Not shown is a device for distributing refrigerant to parallel flows within the evaporation device 20. Such a device is well-known in this field of technology, and its form depends on the particular type of the evaporation device 20.

Linked to the evaporation device 20 is a feed line 26 for refrigerant, which is provided with an expansion valve 28. The expansion valve 28 is designed to control a stream of refrigerant through the feed line 26. The feed line 26 conducts refrigerant to the evaporation device 20 in such a manner that the lower evaporators 24b, 24c are flowed through in parallel by refrigerant. Equally, a parallel flow of refrigerant arises through evaporators 24a and 24d, which with respect to the flow of refrigerant are respectively arranged downstream of evaporators 24b, 24c. One can accordingly say that in each instance a pair of evaporators 24b, 24c and 24a, 24d is flowed through in parallel by refrigerant, and two pairs are arranged in each instance in series with respect to a stream of refrigerant.

A drain line 30 serves to discharge refrigerant from the evaporation device 20. A refrigerant sensor 32 is incorporated into the drain line 30. In this case the refrigerant sensor is a temperature sensor which measures the temperature of the refrigerant in the drain line 30. In this embodiment the refrigerant sensor 32 is capable of dispatching electrical sensor signals. Via an electrical control line (represented in FIG. 2 as a dash-dotted line) the sensor 32 is connected to the expansion valve 28. The expansion valve 28 is designed for electric drive in accordance with the sensor signals. Alternatively, another suitable connection between sensor 32 and expansion valve 28 may also have been provided, for example a mechanical connection or via an interconnected control device. What is important is that a drive of the expansion valve 28 can be effected in accordance with the refrigerant sensor 32. Not shown in FIG. 2 is the complete refrigerant circuit, in which the feed line 26 and the drain line 30 are connected to one another in such a manner that a closed refrigerant circuit arises. Furthermore, additional components which are not shown—such as, for example, a condenser, a compressor and/or a filter—may be provided in the refrigerant circuit.

Main coolant feeders 34, 36 pertain respectively to different independent coolant circuits 16, 17. The coolant circuits 16, 17 are not shown completely here. A person skilled in the art will readily see that the circuits are closed and that still further components may be added to them, for example loads, heat-exchangers or filters.

Main coolant feeder 34 branches into two coolant supply lines 34a, 34c arranged hydraulically parallel to one another. There is provision that coolant supply line 34a is connected to evaporator 24a for the purpose of supplying coolant, and that coolant supply line 34c is connected to evaporator 24c for the purpose of supplying coolant. In turn, main coolant feeder 36 branches into two coolant supply lines 36b, 36d, coolant supply line 36b being connected to evaporator 24b, and coolant supply line 36d being connected to evaporator 24d, likewise in each instance for the purpose of supplying coolant to evaporators 24b, 24d.

Coolant discharge lines 38a and 38c are respectively connected to evaporators 24a and 24c for the purpose of discharging coolant. Coolant discharge lines 38a and 38c are merged to form a main coolant drain 38 of coolant circuit 16 downstream of the evaporation device 20. Analogously, coolant discharge lines 40b and 40d are respectively connected to evaporators 24b and 24d for the purpose of discharging coolant from said evaporators. Coolant discharge lines 40b and 40d are merged to form a main coolant drain 40 of coolant circuit 17. In the drawing, parts of the supply lines and discharge lines to the evaporators that are concealed in perspective in this sketch are represented by dashed lines.

The evaporators 24a-d of the evaporation device 20 are hydraulically separate from one another with respect to the flow of coolant. As a result, with respect to the coolant four hydraulically mutually independent quadrants arise in the evaporation device 20. In this embodiment it is assumed that the coolant circuits are designed in each instance for an equal nominal load; should this not be the case, it may be expedient to design the cross-sections of the evaporators 24a-d not to be identical, as is the case in this embodiment, but to be of differing size. Likewise, it is assumed here that the supply lines 34a, 34c, 36b, 36d (as also the discharge lines) have been designed to the effect that streams of coolant of comparable size pass through them. As needed, the design may of course also be otherwise; for example, it could be expedient to design supply lines 34c and 36b respectively for a larger stream of coolant than supply lines 34a, 36d.

In the embodiment described here, supply lines 34a,c and 36b,d are connected to the evaporation device 20 in the clockwise direction in each instance alternately, according to assigned coolant circuit 16, 17. As can be discerned, the supply lines 34a,c and 36b,d in FIG. 2 are arranged in such a manner that each of, in each instance, two evaporators (e.g. 24b, 24c) flowed through pairwise in parallel by refrigerant is assigned to a supply line for coolant (e.g. 36b, 34c) from differing coolant circuits 16, 17. Moreover, the coolant supply lines 34a, 36b, 34c, 36d are arranged in such a manner that the direction of flow of the coolant runs antiparallel within evaporators 24a, 24d and 24b, 24c flowed through in parallel by refrigerant for various assigned coolant circuits 16, 17. The evaporators 24b, 24c and 24a, 24d are accordingly flowed through by coolant in each instance in opposite directions.

In operation, refrigerant is supplied to the evaporation device 20 via the feed line 26. In this process the stream of refrigerant is controlled by the expansion valve 28. The refrigerant flows in parallel through evaporators 24b, 24c and subsequently likewise in parallel through evaporators 24a, 24d. Downstream of the evaporation device 20 the refrigerant in the drain line 30 is merged. In this embodiment the refrigerant sensor 32 monitors the temperature of the refrigerant. The temperature of the refrigerant serves as a measure of its degree of saturation with refrigerant in liquid phase. If the temperature is above a critical value, which depends on the precise conditions of the cooling system and on the coolant being used, the proportion of liquid coolant is too low or even no longer present. The critical temperature can be established for each system as needed. There are, of course, also further parameters, on the basis of which the saturation state of the refrigerant can be monitored by a sensor, for example density or pressure.

Via the electrical connection to the expansion valve 28 the refrigerant sensor 32 dispatches electrical sensor signals. The expansion valve 28 is driven in accordance with these signals. If the refrigerant sensor 32 establishes too high a temperature of the refrigerant, which permits too low a proportion of liquid refrigerant, and hence insufficient cooling of the coolant circuits, to be inferred, the expansion valve 28 opens further, in order to enlarge the stream of refrigerant to the evaporation device 20 in order to adjust a sufficient stream of refrigerant. Conversely, in the case where a very high proportion of liquid refrigerant in the stream of refrigerant is measured (low temperature), the expansion valve 28 can be closed somewhat, in order to diminish the stream of refrigerant to the evaporation device 20.

The system that has been described is distinguished by a very reliable cooling of all coolant circuits. If, for example, a coolant circuit 16 requires no cooling (for instance, because it has failed or the loads supplied by it are not required), the other coolant circuit 17 is nevertheless cooled completely, since an exchange of heat takes place between the coolant conducted in circuit 17 and refrigerant in evaporators 24b,d. In the process, refrigerant likewise flows through evaporators 24a, 24d; however, given no loading of coolant circuit 16 no appreciable exchange of heat occurs, and hence also almost no evaporation, or even no evaporation at all, of refrigerant arises. The sensor 32 will drive the expansion valve 28 in such a manner that a stream of refrigerant arises that is adjusted to the cooling requirement of circuit 17.

However, in the case where both circuits 16, 17 are subject to load and one of them, for example circuit 16, is subject to overload, in operation at least a partial cooling of the less loaded circuit 17 is always ensured. In this case, refrigerant flows in parallel through evaporators 24b,c, so that in each instance the fraction of refrigerant of the circuits 16, 17 supplied through supply lines 36b, 34c is able to exchange heat with liquid refrigerant flowing through evaporators 24b, 24c. It is to be assumed that circuit 16 with increased loading completely evaporates the refrigerant available to it in evaporator 24c for the purpose of exchanging heat (since it is subject to overload). Accordingly, gaseous refrigerant flows from evaporator 24c onward to evaporator 24d, where it comes into contact with previously uncooled coolant from circuit 17. The gaseous refrigerant is not very efficient for cooling, so that this branch of coolant circuit 17 remains uncooled or very poorly cooled. In the other branch, however, in evaporator 24b the entire refrigerant is not evaporated in the course of the cooling of the partial stream of circuit 17 which is conducted through there. Therefore partially liquid refrigerant (the proportion of liquid refrigerant depending on the cooling load of circuit 17) flows to evaporator 24a. In the latter an exchange of heat takes place between coolant from the overloaded circuit 16 and the refrigerant which here still exhibits cooling-efficient liquid constituents. Accordingly, this branch of the overloaded coolant circuit is likewise subjected to at least a partial cooling. Overall, a cooling of both circuits accordingly results, without the overloaded circuit completely preventing a cooling of the other circuit with lower load.

In operating states between the extreme cases described here, a suitable stream of refrigerant can be easily adjusted by the interaction of sensor 32 and valve 28.

The arrangement described above is distinguished in that it requires only one sensor and only one expansion valve in order to provide at least a partial cooling to all the circuits even in extreme cases. This is obtained by purely structural measures. As a result, the arrangement becomes particularly robust, reliable and low-maintenance. In addition, it saves weight, which in an aircraft is of particularly great importance for cost efficiency. Of course, there are numerous possibilities for a person skilled in the art to modify the embodiment described above within the scope of the inventive idea. For example, it is not necessary to use only four evaporators but on the contrary a number other than four may be expedient.

What is claimed is:

1. Aircraft cooling system evaporator arrangement, comprising:
    an evaporation device for exchanging heat between a refrigerant and a coolant, the evaporation device including at least four evaporators which are hydraulically separate from one another with respect to the flow of coolant;
    at least one feed line for supplying refrigerant to the evaporation device, the at least four evaporators arranged such that refrigerant flows from the at least one feed line into first and second ones of the at least four evaporators, refrigerant from the first evaporator flows into and through a third one of the at least four evaporators, and refrigerant from the second evaporator into and through a fourth one of the at least four evaporators, the first and third evaporators defining a first pair of evaporators arranged parallel to a second pair of evaporators defined by the second and fourth evaporators; and
    two mutually independent coolant circuits, wherein
    each coolant circuit includes at least two supply lines arranged to be hydraulically separate from one another, the at least two supply lines of a first one of the coolant circuits comprising a first coolant supply line supplying coolant to one of the evaporators in the first pair of evaporators and a second coolant supply line supplying coolant to one of the evaporators in the second pair of evaporators, the at least two supply lines of a second one of the coolant circuits comprising a first coolant supply line supplying coolant to the other of the evaporators in the first pair of evaporators and a second coolant supply line supplying coolant to the other of the evaporators in the second pair of evaporators.

2. Aircraft cooling system evaporator arrangement according to claim 1, wherein each coolant circuit further includes at least two discharge lines arranged to be hydraulically separate from one another, the at least two discharge lines of the first coolant circuit comprising a first discharge line discharging coolant from the one of the evaporators in the first pair of evaporators and a second discharge line discharging coolant from the one of the evaporators in the second pair of evaporators, the at least two discharge lines of the second coolant circuit comprising a first discharge line discharging coolant from the other of the evaporators in the first pair of evaporators and a second discharge line discharging coolant from the other of the evaporators in the second pair of evaporators.

3. Aircraft cooling system evaporator arrangement according to claim 1, wherein coolant flow through the two evaporators in at least one of the first and second pairs of evaporators takes place in opposite directions relative to one another.

4. Aircraft cooling system evaporator arrangement according to claim 1, which further includes at least one drain line for discharging refrigerant from the evaporation device.

5. Aircraft cooling system evaporator arrangement according to claim 4, wherein furthermore a refrigerant sensor is arranged in the drain line.

6. Aircraft cooling system evaporator arrangement according to claim 5, wherein the refrigerant sensor is a temperature sensor.

7. Aircraft cooling system evaporator arrangement according to claim 5, wherein the refrigerant sensor is a pressure sensor.

8. Aircraft cooling system evaporator arrangement according to claim 5, wherein the refrigerant sensor is a density sensor.

9. Aircraft cooling system evaporator arrangement according to claim 5, wherein the refrigerant sensor is adapted to generate electrical sensor signals.

10. Aircraft cooling system evaporator arrangement according to claim 1, which further includes an expansion valve for controlling a supply of refrigerant to the evaporation device.

11. Aircraft cooling system evaporator arrangement according to claim 10, wherein the expansion valve is arranged in the feed line.

12. Aircraft cooling system evaporator arrangement according to claim 10, wherein the expansion valve is a valve that is adapted to be driven electrically.

13. Cooling system of an aircraft including an evaporator arrangement according to claim 1.

14. Aircraft including a cooling system according to claim 13.

15. Aircraft including an evaporator arrangement according to claim 1.

* * * * *